United States Patent [19]

Moore et al.

[11] Patent Number: 4,859,028

[45] Date of Patent: Aug. 22, 1989

[54] NARROW-BAND OPTICAL ABSORPTION FILTER

[75] Inventors: James Moore; Michael Kale, both of Ridgefield; George Csanak, Stamford, all of Conn.

[73] Assignee: Barnes Engineering Company, Shelton, Conn.

[21] Appl. No.: 252,449

[22] Filed: Apr. 9, 1981

[51] Int. Cl.$^4$ ............................................. G02B 5/22
[52] U.S. Cl. ..................................... 350/1.1; 350/311
[58] Field of Search ................................ 350/1.1, 311

[56] References Cited

U.S. PATENT DOCUMENTS

| | | | |
|---|---|---|---|
| 3,312,759 | 4/1967 | Letter | 350/1.1 |
| 3,887,485 | 6/1975 | Neuroth . | |
| 3,914,516 | 10/1975 | Ritter . | |
| 4,101,331 | 7/1978 | Anderson . | |
| 4,177,321 | 12/1979 | Nishizawa . | |
| 4,247,175 | 1/1981 | Saxe . | |

FOREIGN PATENT DOCUMENTS 1954802  3/1971  Fed. Rep. of Germany ...... 350/311

OTHER PUBLICATIONS

Handbook of Optics, "Crystal with Color Centers and Doped Materials," Chpt. 8, p. 26.
V. V. Udod, "Absorbing Light Filters for the Visible and Infrared Regions of the Spectrum Based on Alkali Halide Crystals Colored by X Centers," Feb., 1969.
U.S. Goverment Report by Pacific-Sierra Research Corp., "Theoretical Study of Protection of Optical Systems From Pulsed-Laser Irradiation," Nov., 1980.
Ahrenkiel et al., "A New Saturable Absorber for the $CO_2$ laser using Doped KCl", Jul., 1978.
Mirlin & Reshina, "Formation of Divalent Anion and Cation Impurity Complexes in KCl Crystals," Sep., 1967.
Smith et al., "Matrix Infrared Spectra and Anharmonic Force Field of $NCO^{-*}$", Sep., 1972.
See Attached List.

Primary Examiner—Bruce Y. Arnold
Attorney, Agent, or Firm—Brumbaugh, Graves, Donohue & Raymond

[57] ABSTRACT

A selected impurity in a crystal is provided as a narrow-band absorption filter for optical radiation. The crystal lattice constant may be adjusted, for example, by forming a mixed crystal, to adjust the absorption frequency.

24 Claims, 1 Drawing Sheet

4,859,028

NARROW-BAND OPTICAL ABSORPTION FILTER

BACKGROUND OF THE INVENTION

This invention relates to optical filters, particularly to narrow-band filters for absorbing optical radiation having a particular selected frequency inside the narrow-band, and for efficiently transmitting optical radiation having frequencies outside the narrow-band but within a broader frequency band surrounding the narrow-band. Typically, the width of the narrow-band is around 5-20 cm$^{-1}$ and the width of the broader band is around 200-1000 cm$^{-1}$ Certain materials, particularly certain diatomic or polyatomic molecular ions, are known to have what are commonly called matrix isolation spectral bands. When these ions are solved within a crystal of another material, i.e., a solid solvent, they form impurities in the crystal, which is called the "matrix" for the "isolated" molecular ion.

Matrix isolation of molecular ions is useful for analyzing the spectral absorption characteristics of the particular impurity, since spectra of the matrix isolated impurity ion are similar to that of the free molecular ion. Thus, when molecular ion impurities are dissolved in a crystal, analysis of their spectral properties is facilitated, and such analyses have been reported in the literature.

Hitherto the matrix isolation absorption properties of materials in crystals have not been used in connection with filtering of optical radiation.

It is an object of the present invention to provide an optical absorption filter which absorbs optical radiation having a selected frequency, but transmits other radiation within a frequency band which includes the selected frequency.

It is a further object of the present invention to provide such a filter which will pass a high proportion of optical radiation within the frequency band of interest.

It is a further object of the present invention to provide such a filter wherein the absorption frequency of an impurity can be adjusted to coincide with a selected frequency.

SUMMARY OF THE INVENTION

In accordance with the invention, there is provided a method for making a narrow-band absorption filter for absorbing optical radiation at a selected frequency and for passing optical radiation at other frequencies within a selected frequency band which include the selected frequency. The method includes the steps of selecting an impurity material having narrow-band absorption properties at a frequency near the selected frequency. A crystal material is selected which has substantial transmission properties over the selected frequency band. The lattice constant of the crystal is adjusted, to thereby adjust the absorption frequency of the impurity to coincide with the selected frequency, and a filter is formed comprising the impurity in the latticeconstant adjusted crystal.

In particular examples of the present invention, the lattice constant adjustment is effected by forming a mixed crystal of two selected crystal materials. In one example, the two materials have the same anion, and in another example the two materials have the same cation. The frequency of absorption of the impurity material can be lowered by substituting a heavier ion in the mixed crystal. The frequency can be increased by substituting a lighter ion in the mixed crystal. The impurity material is preferably a multiatom ion which has resonance properties, which cause the narrow-band absorption.

In accordance with the invention, there is provided a filter designed by the foregoing method.

In accordance with the invention, there is provided a composition of matter comprising a mixed crystal having 55 to 95 atomic percent of a first alkali-halide, 5 to 45 atomic percent of a second alkali-halide and 0.25 to 5 atomic percent of an impurity.

The alkali-halides which form the mixed crystal may have either the same cation or the same anion. The impurity may be cyanate ion which can be present preferably in the range of 0.5 to 3 atomic percent. Other suitable impurity materials are perrhenate and chromate.

One particular example is a composition of matter having 5 to 35 percent potassium bromide, 65-95 atomic percent rubidium bromide and 0.5-3 atomic percent cyanate ion as an impurity.

In accordance with the invention, there is provided a narrow-band filter for absorbing optical radiation at a selected frequency and for passing optical radiation of other frequencies within a selected frequency band, which includes the selected frequency. The filter comprises a mixed crystal having component crystal materials with a low average optical density over the frequency band. The mixed crystal has a selected crystal component ratio and has an impurity having a narrow-band spectral absorption characteristic at a frequency near the selected frequency. The crystal component ratio is selected to adjust the lattice constant of the mixed crystal thereby to adjust the impurity spectral absorption characteristic to the selected frequency.

The mixed crystal is preferably an alkali-halide mixed crystal having either identical anions for the two components or identical cations for the two components. The impurity can be a multi-atom ion, such as cyanate ion or perrhenate ion.

In accordance with the invention, there is provided a narrow-band filter for absorbing radiation from a hydrogen fluoride laser at a wavelength of 2.911 microns and for transmitting radiation in a surrounding frequency band with a high transmission ratio. The filter comprises an alkalihalide crystal having optical incidence and transmission surfaces and an impurity of approximately 1 atomic percent cyanate ions.

Suitable alkali-halides for use in the narrow-band filter include potassium bromide, rubidium bromide and potassium iodide. The crystal may be a mixed crystal having plural alkali-halides, such as potassium bromide and potassium iodide, or potassium bromide and rubidium bromide.

In accordance with the present invention there is provided a narrow-band filter for absorbing radiation from a carbon dioxide laser with a wavelength of 10.59 microns and for transmitting radiation in a surrounded frequency band with a high transmission ratio. This filter comprises an alkali-halide crystal having optical incidence and transmission surfaces and an impurity of approximately 1 atomic percent perrhenate ion or chromate ion.

Suitable alkali-halides for this crystal include sodium bromide, potassium bromide and lithium bromide. The crystal may be a mixed alkali-halide crystal, for example potassium bromide and sodium bromide, or sodium bromide and lithium bromide.

In accordance with the invention there is provided a narrow-band absorption filter for selectively absorbing optical radiation at a desired frequency in a selected frequency band and for passing optical waves at other frequencies in the frequency band. The filter comprises a selected impurity in a selected crystal. The impurity has narrowband isolation-matrix absorption properties at the desired frequency in the crystal, and the crystal has substantial transmission properties in the selected frequency band.

The selected impurity may have minority isotopic elements such as oxygen −18 in cyanate ion impurity.

For a better understanding of the present invention, together with other and further objects, reference is made to the following description, taken in conjunction with the accompanying drawings and its scope will be pointed out in the appended claims.

DESCRIPTION OF THE INVENTION

Figure 1:
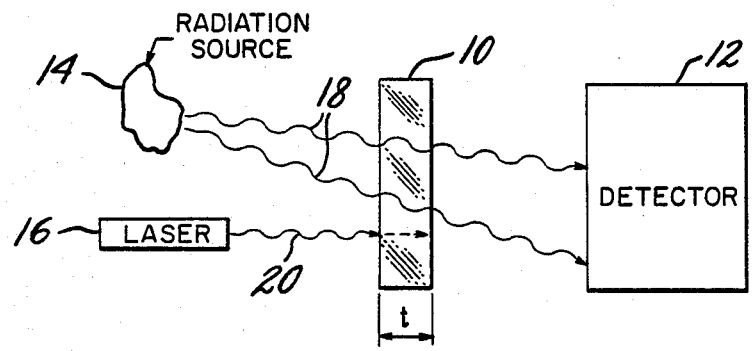
FIG. 1 is a drawing showing a system which uses a filter in accordance with the present invention.

FIG. 1 shows an optical system, for example an infrared detection system, using a filter 10 in accordance with the preset invention. The system of FIG. 1 includes a detecting device 12, such as an infrared camera, to be used for detecting infrared or other optical frequency radiation emanating from a radiation source 14. Also shown in FIG. 1 is a laser 16 which emits a laser beam 20, which may seriously interfere with the detection of radiation from source 14 by detector 12. The filter 10 of FIG. 1 has optical incidence and transmission surfaces and is designed to pass most of the relatively broad-band radiation from radiation source 14, indicated by waves 18, and to absorb the single frequency radiation from laser 16. Thus, by use of filter 10, it is possible to specifically filter out interfering laser radiation while detecting radiation in the same frequency band emanating from source 14.

Figure 2:
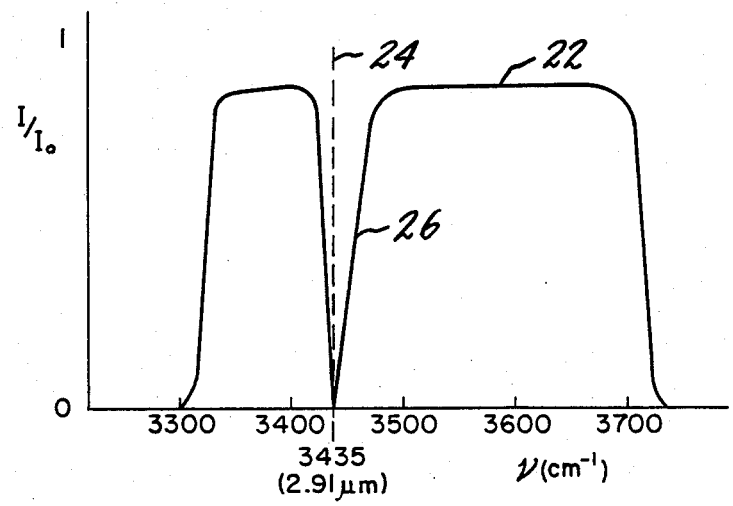
FIG. 2 is a graph showing the spectral transmission characteristics of the filter of FIG. 1.

In order to achieve the objects of the filter 10 shown in FIG. 1, it is necessary that the filter have a transmission characteristic which is shown by the graph of FIG. 2. The radiation detector 12 is adapted to receive, for example, infrared radiation having wave numbers from approximately 3300 to 3700 cm.$^{-1}$. It is therefore desired to have a relatively flat and high transmission ratio over that frequency band as indicated by the flat top portion 22 of the transmission curve plotted in FIG. 2. In order to filter out narrow-band radiation from laser 16, which is assumed to have a transmission frequency indicated by line 24 in FIG. 2, the curve of relative filter transmission $I/I_o$ has a deep and narrow-band notch 26. Thus, a large proportion of the desired wide-band radiation from source 14 will pass through filter 10 and be received by detector 12, while single-frequency or narrow-band radiation from laser 16 will be largely absorbed by filter 10 and will not interfere with the operation of detector 12.

As previously mentioned, certain materials, particularly multi-atom ions such as cyanate, perrhenate, cyanide, nitrite, carbonate, bicarbonate, azide, hydrogen fluoride ($HF_2$), hydroxide, ammoniate, boron hydrite, chromate and borate, among others are known to have narrow-band spectral absorption characteristics at discrete frequencies, including frequencies of interest in the infrared spectrum. These frequencies are very often measured in an isolation matrix measurement, wherein spectral characteristics of an impurity material, such as an ion, are measured by placing small quantities, for example 0.1 atomic percent of the material in a crystal of another material. As used herein the term atomic percent refers to the percent of a particular substance in a crystal as compared to the number of ions of similar substances. Thus, atomic percent of an aklali-halide salt refers to the ratio of the number of atoms of that salt to total ions in the crystal. Atomic percent of an ion refers to the ratio of the number of ions of a particular type, e.g. anions or cations, to similar ions in a crystal. Heretofore, such isolation matrix measurements of crystal impurities have been made for the purpose of scientific study and evaluation, and no practical applications of such isolation matrix absorption characteristics were known.

The present invention is a result of the inventors' discovery that isolation matrix absorption properties of an impurity, which very often are narrow-band, can be used for the purpose of providing a narrow-band filter for filtering out undesired interfering radiation from broad-band radiation received by a detector.

As an example, the inventors have investigated the possibility of making a narrow-band absorption filter for filtering out interfering radiation from a hydrogen fluoride (HF) laser with a wavelength of 2.911 microns (wave number 3435 cm.$^{-1}$) from other radiation in the surrounding infrared spectrum. As described above, the desired characteristics for transmission of such a filter for the HF laser are illustrated by the graph of FIG. 2.

In investigating materials for absorption of HF laser radiation, the present inventors have determined that the cyanate ion (NCO-1) has absorption characteristics very close to the desired wave number of 3435 cm.$^{-1}$. The cyanate ion has an absorption line at 3442 in potassium bromide crystal and 3432 in rubidium bromide crystal.

While the cyanate ion in a pure crystal, such as potassium bromide and rubidium bromide can have a broad enough spectrum, with a high impurity doping, to provide substantial absorption characteristics at the frequency of interest, it has been discovered by the inventors that further improvement in the absorption characteristics of the cyanate ion, with respect to the frequency of the hydrogen fluoride laser, can be made by adjusting the lattice constant of the crystal. One way of adjusting the lattice constant is by using a mixed crystal, for example rubidium bromide and potassium bromide; potassium bromide and potassium iodide; thallium bromide and thallium chloride; or cesium chloride and cesium bromide. Such mixed crystals enable adjustment of the lattice constant of the crystal which thereby causes an adjustment of the absorption frequency of the impurity.

With respect to lattice constant adjustment, the inventors have found that a larger average lattice constant, caused, for example, by the substitution of a heavier ion in the crystal, lowers the absorption frequency of the impurity. The corollary is also true, that is, the substitution of a lighter ion in the crystal will give a smaller lattice constant and increase the absorption frequency of the impurity.

Figure 3:
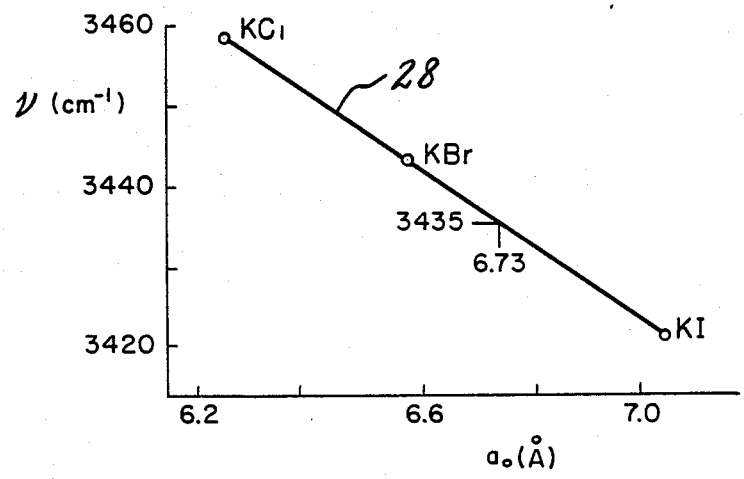
FIG. 3 is a graph showing isolation-matrix absorption wave number for cyanate ion as a function of crystal lattice constant.

The variation in lattice constant and absorption frequency for the cyanate ion at the frequencies of interest is illustrated by the graph 28 of FIG. 3. Shown in the graph are absorption frequencies for the lattice constants corresponding to potassium chloride, potassium bromide and potassium iodide crystals. Also shown in the drawing is the absorption frequency for a mixed potassium bromide-potassium iodide crystal with a component crystal ratio of 60 atomic percent potassium bromide, 39 atomic percent potassium iodide and approximately 1 atomic percent of cyanate ion doping (one percent of bromine and iodine anions replaced by cyanate ions). This has an absorption frequency precisely at the hydrogen fluoride laser frequency of interest.

EXAMPLE I

A mixed crystal consisting of 60 atomic percent potassium bromide, 39 atomic percent potassium iodide and 1 atomic percent cyanate ion was prepared as follows:

A mixture of fused potassium bromide and potassium iodide in the proportions indicated was combined with potassium cyanate, in a ratio of 1 atomic percent, to introduce the cyanate ion impurity. A crystal was grown by the Czochralski technique. The crystal was found to have an optical density of 2.6 per cm. at a wave number of 3435 cm.$^{-1}$ corresponding to the emission frequency of a hydrogen fluoride laser. The crystal was found to have an optical transmission ratio of approximately 90% over a frequency range of 3300 to 3700 cm.$^{-1}$.

EXAMPLE II

A crystal was prepared consisting of 10 atomic percent potassium bromide, 89 atomic percent rubidium bromide and 1 atomic percent cyanate ion in the form of potassium cyanate. A crystal was grown by the Czochralski technique and measurements of the optical characteristics of the crystal indicated that the crystal had a sharp absorption line for radiation at 3435 cm.$^{-1}$ with 2.6 per cm. optical density and a transmission over the frequency band of interest from 3300–3700 of approximately 92%.

Those skilled in the art will recognize the transmission of the crystals mentioned above can be improved by coating the crystals with appropriate materials.

While the ratio of component crystal materials for a mixed crystal is selected for the purpose of tuning the impurity absorption frequency to the desired frequency, as described with reference to FIG. 3, in the case of alkalihalide mixed crystals it is generally desirable to avoid a mixed crystal having a component crystal ratio of approximately equal parts of two component crystal materials, because of a possible adverse effect on crystal stability. Thus, such mixed alkali-halide crystals will generally constitute 55 to 95 atomic percent of a first component crystal material and 5 to 45 atomic percent of a second crystal material. It is anticipated that second crystal material proportions of less than 5 atomic percent will have insignificant tuning effect.

The optical density of the filter is largely determined by the amount of impurity material introduced. The amount of 1 atomic percent as set forth in the examples gives good optical density at the absorption frequency (2.6 per cm.), so that a filter with an optical density of 4 can be made with a transmission length of less than 2 cm. Lower impurity percentages can be used where lower optical absorption density is required, for example, 0.25 or 0.5 atomic percent. Higher impurity percentages will give greater optical density at the absorption frequency, but impurity percentages in excess of 2 percent, for example 5 atomic percent, have been found to broaden the absorption line at the selected frequency, and possibly at other spectral absorption frequencies of the impurity within the band of interest. This broadening may be helpful where the absorption frequency is not precisely at the desired frequency, or where wider-band interference is anticipated, but it will adversely effect the average optical transmission properties of the filter over the band of interest.

Experiments have shown that increasing the amount of the doping material to approximately 5% causes a broadening of the absorption frequency band, which can adversely affect the broad-band transmission characteristics of the filter.

Investigations have been made into the possibility of a similar narrow-band absorption filter for absorbing the carbon dioxide laser radiation at a wavelength of 10.59 microns. Investigations indicate that perrhenate ion would be suitable for absorbing radiation having this frequency, and likely crystals for use in connection with perrhenate ion include sodium bromide, potassium bromide, lithium bromide, potassium chloride and cesium chloride. A combination crystal having components of sodium bromide and potassium bromide, components of sodium bromide and lithium bromide, or components of potassium chloride and cesium chloride would probably provide suitable lattice constant adjustment possibilities by the formation of a mixed crystal. Other possible impurities for absorbing carbon dioxide laser radiation are bicarbonate and chromate.

An absorption filter for the carbon dioxide laser radiation at 10.59 microns using chromate ion as an impurity is described in the following example.

EXAMPLE III

A crystal was prepared consisting of 75 atomic percent potassium chloride, 22.41 atomic percent potassium bromide, 1.59 atomic percent lead chloride and 1 atomic pecent potassium chromate. A crystal was grown by the Cyochralski technique and demonstrated optical absorption of radiation at 10.59 microns corresponding to an optical density of 1 per cm. with high transmission at adjacent frequencies. In this crystal the lead chloride was added for crystal charge compensation to provide electrical balance and crystal stability. The absorbing impurity is the chromate ion impurity.

In the foregoing examples the adjustment of absorption frequency is achieved by an adjustment of crystal lattice constant. Another possible adjustment mechanism is variation in the isotope content of the impurity material. Thus an absorption filter for the 2.911 micron HF laser line can be formed by dissolving isotopic cyanate $^{14}N^{12}C^{18}O$ in pure potassium chloride crystal. The isotopic cyanate has a minority oxygen-18 isotope, which gives a different absorption frequency than the natural oxygen-16 isotope.

While investigations thus far have centered about absorption of particular laser radiations in the infrared frequency spectrum, the principles of the present invention may be applicable to absorbing undesired radiation at visible light frequencies by the use of electronic transition spectral absorption characteristics rather than the mechanical ion vibration absorption spectral characteristics typical of the infrared filters described. It is believed that adjustment of the crystal lattice constant adjusts absorption frequency by changing the electric field environment of the impurity ion. A similar adjustment of the electric field environment of an atom impurity having appropriate transition electron spectral absorption characteristics, such as the transition metals, could probably be used for the purpose of tuning the absorption frequency of an impurity atom to obtain a narrowband filter operating in the visible frequency band.

While there have been described what are believed to be the preferred embodiments of the present invention, those skilled in the art will recognize that other and further modifications may be made thereto without departing from the spirit of the invention, and it is intended to claim all such changes as fall within the true scope of the invention.

We claim:

1. A method of making a narrow-band absorption filter for absorbing optical radiation at a desired frequency and for passing optical radiation at other frequencies within a selected frequency band which includes said desired frequency, comprising the steps of:
   selecting an impurity material having narrowband absorption properties in crystals at a frequency near said desired frequency;
   selecting a first crystal material having matrix isolation absorption characteristics for said impurity with narrow-band absorption above said desired frequency; and having substantial transmission properties over said selected frequency band;
   selecting a second crystal material having matrix isolation absorption characteristics for said impurity with narrow-band absorption below said desired frequency, having substantial transmission properties over said selected frequency band and having crystal forming compatibility with said first selected crystal material;
   selecting a ratio of said first crystal and said second crystal to adjust said narrow-band absorption to said desired frequency;
   and forming a filter comprising a mixed crystal of said first and second crystal materials with said selected ratios and a selected amount of said impurity.

2. A method as specified in claim 1 wherein said impurity is selected from the group consisting of multi-atom ions.

3. A method as specified in claim 2 wherein said impurity ion is selected to have narrow-band absorption properties comprising mechanical resonance properties.

4. A filter made by the method of claim 1.

5. A method as specified in claim 1 wherein said step of selecting a second crystal material comprises selecting a second crystal material having the same anion as said first crystal material.

6. A method as specified in claim 1 wherein said step of selecting a second crystal material comprises selecting a second crystal material having the same cation as said first crystal material.

7. A narrow-band filter for absorbing optical radiation at a desired frequency and for passing optical radiation at other frequencies within a selected frequency band which includes said desired frequency, comprising a mixed crystal having component crystal materials with a low average optical density over said frequency band, and a selected crystal component ratio, and an impurity in said crystal having a narrow-band spectral absorption characteristic at a frequency near said desired frequency, said crystal component ratio being selected to adjust the lattice constant of said mixed crystal thereby to adjust said impurity spectral absorption characteristic to said desired frequency.

8. A narrow-band filter as specified in claim 7 wherein said component crystal materials comprise alkalihalides.

9. A narrow-band filter as specified in claim 7 or 8 wherein said component crystal materials have identical anions.

10. A narrow-band filter as specified in claim 7 or 8 wherein said component crystal materials have identical cations.

11. A narrow-band filter as specified in claim 7 or 8 wherein said impurity comprises a multi-atom ion.

12. A narrow-band filter as specified in claim 11 wherein said impurity comprises perrhenate ion.

13. A narrow-band filter as specified in claim 11 wherein said impurity comprises cyanate ion.

14. A narrow-band filter as specified in claim 11 wherein said impurity comprises chromate ion.

15. A narrow-band filter for absorbing radiation from a hydrogen fluoride laser at a wavelength of 2.911 microns and for transmitting radiation in a surrounding frequency band with a high transmission ratio, comprising an alkali-halide crystal having optical incidence and transmission surfaces and an impurity of approximately one atomic percent cyanate ions, wherein said crystal comprises a mixed alkali-halide crystal having a plurality of component crystal materials.

16. A narrow-band filter as specified in claim 15 wherein said component crystal materials comprise potassium bromide and potassium iodide.

17. A narrow-band filter as specified in claim 15 wherein said component crystal materials comprise potassium bromide and rubidium bromide.

18. A narrow-band filter for absorbing radiation from a carbon dioxide laser at a wavelength of 10.59 microns and for transmitting radiation in a surrounding frequency band with a high transmission ratio, comprising a mixed alkalihalide crystal having a plurality of component crystal materials and having optical incidence and transmission surfaces and an impurity of approximately one atomic percent perrhenate ion.

19. A narrow-band filter as specified in claim 18 wherein said component crystal materials comprise potassium bromide and sodium bromide.

20. A narrow-band filter as specified in claim 18 wherein said component crystal materials comprise sodium bromide and lithium bromide.

21. A narrow-band filter as specified in claim 18 wherein said component crystal materials comprise potassium chloride and cesium chloride.

22. A narrow-band filter for absorbing radiation from a carbon dioxide laser at a wavelength of 10.59 microns and for transmitting radiation in a surrounding frequency band with a high transmission ratio, comprising an alkali-halide crystal having optical incidence and transmission surfaces and an impurity of approximately one atomic percent chromate ion, wherein said crystal comprises a mixed alkali-halide crystal having a plurality of component crystal materials.

23. A narrow-band filter as specified in claim 22 wherein said component crystal materials comprise potassium chloride and potassium bromide.

24. A narrow-band filter as specified in claim 23 wherein said crystal further includes lead chloride.

* * * * *

UNITED STATES PATENT AND TRADEMARK OFFICE
CERTIFICATE OF CORRECTION

PATENT NO. : 4,859,028

DATED : August 22, 1989

INVENTOR(S) : Moore et al.

Page 1 of 2

It is certified that error appears in the above-identified patent and that said Letters Patent is hereby corrected as shown below:

On the title page:

Last line of "[56]... Other Publications", delete the phrase "See Attached List.";

Col. 1, line 17, "solved" should read --dissolved--;
Col. 1, line 49, "include" should read --includes--;
Col. 1, line 58, "latticeconstant" should read --lattice-constant--;
Col. 2, line 1, "multiatom" should read --multi-atom--;
Col. 2, line 46, "alkalihalide" should read --alkali-halide--;
Col. 3, line 31, "preset" should read --present--;
Col. 4, lines 9-10, " atomic percent " should read --"atomic percent"--;
Col. 5, line 52, "alkalihalide" should read --alkali-halide--;
Col. 6, line 12, "effect" should be --affect--;
Col. 6, line 43, "pecent" should read --percent--;
Col. 6, line 44, "Cyochralski" should be --Czochralski--;
Col. 7, line 24, "narrowband" should read --narrow-band--;
Col. 8, line 7, "alkalihalides" should read --alkali-halides--; and

UNITED STATES PATENT AND TRADEMARK OFFICE
CERTIFICATE OF CORRECTION

PATENT NO. : 4,859,028

DATED : August 22, 1989

INVENTOR(S) : Moore, et al.

It is certified that error appears in the above-identified patent and that said Letters Patent is hereby corrected as shown below:

Col. 8, line 41, "alkalihalide" should read --alkali-halide--.

Signed and Sealed this

Fourteenth Day of August, 1990

Attest:

HARRY F. MANBECK, JR.

*Attesting Officer*  *Commissioner of Patents and Trademarks*